(12) United States Patent
Yoo et al.

(10) Patent No.: US 11,563,400 B2
(45) Date of Patent: Jan. 24, 2023

(54) IRON LOSS REDUCTION CONTROL APPARATUS AND METHOD FOR MOTOR PERMANENT MAGNET OVERTEMPERATURE PROTECTION

(71) Applicants: HYUNDAI MOTOR COMPANY, Seoul (KR); KIA CORPORATION, Seoul (KR)

(72) Inventors: Tae Il Yoo, Anyang-si (KR); Seong Min Kim, Changwon-si (KR); Seon Mi Lee, Anyang-si (KR); Ho Sun Jang, Chungcheongnam-do (KR); Ho Rim Choi, Changwon-si (KR); Han Hee Park, Hwaseong-si (KR); Seung Hyeon Bin, Busan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/388,867

(22) Filed: Jul. 29, 2021

(65) Prior Publication Data
US 2022/0123687 A1 Apr. 21, 2022

(30) Foreign Application Priority Data

Oct. 15, 2020 (KR) .................. 10-2020-0133683

(51) Int. Cl.
*H02P 29/66* (2016.01)

(52) U.S. Cl.
CPC ........ *H02P 29/662* (2016.11); *H02P 2207/05* (2013.01)

(58) Field of Classification Search
CPC ..................... H02P 29/662; H02P 2207/05
See application file for complete search history.

(56) References Cited

U.S. PATENT DOCUMENTS 10,418,929 B2 * 9/2019 Aizawa .................. H02P 6/16
2017/0373629 A1 * 12/2017 Shin .................. H02P 21/16

FOREIGN PATENT DOCUMENTS

| JP | 2002-015725 A | 1/2002 |
| JP | 2008-263135 A | 10/2008 |
| KR | 10-2074111 B1 | 2/2020 |
| KR | 10-2121661 B1 | 6/2020 |

\* cited by examiner

*Primary Examiner* — Zoheb S Imtiaz
(74) *Attorney, Agent, or Firm* — Fox Rothschild LLP

(57) ABSTRACT

An iron loss reduction control apparatus for motor permanent magnet overtemperature protection is provided. The apparatus includes: a permanent magnet temperature prediction unit configured to predict a temperature of a permanent magnet in a motor based on a driving state of the motor; a first iron loss reduction unit configured to adjust a switching frequency of a switching element in an inverter providing a driving power to the motor based on the temperature of the permanent magnet; and a second iron loss reduction unit configured to adjust a current command of the motor based on the temperature of the permanent magnet.

18 Claims, 12 Drawing Sheets

IRON LOSS REDUCTION CONTROL APPARATUS AND METHOD FOR MOTOR PERMANENT MAGNET OVERTEMPERATURE PROTECTION

CROSS REFERENCE TO RELATED APPLICATION

The present application claims priority to and the benefit of Korean Patent Application No. 10-2020-0133683, filed on Oct. 15, 2020, the entire contents of which is incorporated herein for all purposes by this reference.

TECHNICAL FIELD

The present disclosure relates to iron loss reduction control apparatus and method for motor permanent magnet overtemperature protection.

BACKGROUND

A moving device such as an automobile using a motor as its power source may mainly use a permanent magnet built-in motor to obtain a large torque. In this permanent magnet built-in motor, the longer time the motor is used for, the higher temperature the internal permanent magnet has due to heat generated by the motor, and irreversible demagnetization of the permanent magnet may occur in which the permanent magnet loses its magnetism when the permanent magnet has a temperature increased to a predetermined level or above.

Therefore, when controlling the motor, it is necessary to continuously monitor the temperature of the permanent magnet to prevent the permanent magnet in the motor from being irreversibly demagnetized and thus to ensure that the temperature of the permanent magnet is not increased to a maximum limit temperature or above, at which the irreversible demagnetization of the permanent magnet occurs, thereby protecting the permanent magnet.

A general motor for power may use the permanent magnet for the rotor, and it may thus be difficult to implement a method of attaching a temperature sensor to the permanent magnet itself to monitor the temperature of the permanent magnet in real time. Accordingly, the following method may be used: a temperature of a stator coil, detected by a temperature sensor installed on the stator coil, is replaced with the temperature of the permanent magnet to monitor the temperature of the permanent magnet, thereby preventing the irreversible demagnetization of the permanent magnet.

However, the stator coil of the motor and the permanent magnet of the rotor may have different heating amounts and heat capacities from each other, and the stator coil and the permanent magnet of the rotor may thus have temperature increase trends different from each other when the motor is driven.

Therefore, when the temperature increase of the permanent magnet is greater than that of the stator coil, and thus the temperature of the stator coil fails to represent the temperature of the permanent magnet, it may be difficult to prevent the irreversible demagnetization of the permanent magnet.

The contents described as the related art have been provided only for assisting in the understanding for the background of the present disclosure and should not be considered as corresponding to the related art known to those skilled in the art.

SUMMARY

The present disclosure provides iron loss reduction control apparatus and method for motor permanent magnet overtemperature protection which may prevent a permanent magnet positioned in a rotor of a motor from being irreversibly demagnetized due to heat generated by the motor when the motor is driven.

According to an embodiment of the present disclosure, an iron loss reduction control apparatus for motor permanent magnet overtemperature protection, includes: a permanent magnet temperature prediction unit predicting a temperature of a permanent magnet in a motor based on a driving state of the motor; a first iron loss reduction unit adjusting a switching frequency of a switching element in an inverter providing a driving power to the motor based on the temperature of the permanent magnet predicted by the permanent magnet temperature prediction unit; and a second iron loss reduction unit adjusting a current command of the motor based on the temperature of the permanent magnet predicted by the permanent magnet temperature prediction unit.

In an embodiment of the present disclosure, the permanent magnet temperature prediction unit may calculate a loss of the motor based on the driving state of the motor, and predict the temperature of the permanent magnet based on the calculated loss of the motor, a temperature of a coolant cooling a core of the motor, and a temperature of a coolant cooling a coil of the motor.

In an embodiment of the present disclosure, the permanent magnet temperature prediction unit may include: a motor loss calculation unit deriving a loss of the core of the motor, a loss of the coil of the motor and a loss of the permanent magnet based on the rotational speed and torque of the motor and a voltage of a battery storing the driving power provided to the motor; a permanent magnet temperature estimation unit calculating the temperature of the permanent magnet based on the loss of the permanent magnet derived from the motor loss calculation unit; a core temperature estimation unit deriving a cooling amount of the core based on a difference between the temperature of the coolant cooling the core and a pre-estimated temperature of the core, deriving a temperature of the core based on the derived cooling amount of the core and the loss of the core derived by the motor loss calculation unit, and deriving a difference between temperatures of the core and the permanent magnet by subtracting the temperature of the permanent magnet based on the loss of the permanent magnet calculated by the permanent magnet temperature estimation unit from the derived temperature of the core; and a coil temperature estimation unit deriving a cooling amount of the coil based on a difference between the temperature of the coolant cooling the coil and a pre-estimated temperature of the coil, deriving a temperature of the coil based on the derived cooling amount of the coil and the loss of the coil derived by the motor loss calculation unit, and deriving a difference between temperatures of the coil and the permanent magnet by subtracting the temperature of the permanent magnet based on the loss of the permanent magnet calculated by the permanent magnet temperature estimation unit from the derived temperature of the coil, and wherein the permanent magnet temperature estimation unit may calculate a final temperature of the permanent magnet by adding both a value obtained by multiplying the difference between the temperatures of the core and the permanent magnet by a heat transfer coefficient between the core and the permanent magnet and a value obtained by multiplying the difference between the temperatures of the coil and the permanent magnet by a heat transfer coefficient between the coil and the permanent magnet to the temperature of the permanent magnet based on the loss of the permanent magnet calculated by the permanent magnet temperature estimation unit.

In an embodiment of the present disclosure, in a case where the temperature of the permanent magnet predicted by the permanent magnet temperature prediction unit is higher than a predetermined reference value, the first iron loss reduction unit may reduce the switching frequency used to pulse width modulation (PWM) control the switching element of the inverter providing the driving power to the motor.

In an embodiment of the present disclosure, in the case where the temperature of the permanent magnet predicted by the permanent magnet temperature prediction unit is higher than the predetermined reference value, the first iron loss reduction unit may reduce the switching frequency to a predetermined reduction value for each predetermined period.

In an embodiment of the present disclosure, in a case where the temperature of the permanent magnet predicted by the permanent magnet temperature prediction unit is higher than the predetermined reference value and the switching frequency is the predetermined reference value or below, the first iron loss reduction unit may change the pulse width modulation (PWM) control method.

In an embodiment of the present disclosure, in a case where the pre-applied PWM control method is a space vector PWM (SVPWM) method, the first iron loss reduction unit may change the SVPWM method to a near state PWM (NSPWM) method.

In an embodiment of the present disclosure, in a case where the pre-applied PWM control method is a near state PWM (NSPWM) method, the first iron loss reduction unit may change the NSPWM method to a discontinuous PWM (DPWM) method.

In an embodiment of the present disclosure, in a case where the temperature of the permanent magnet predicted by the permanent magnet temperature prediction unit is higher than a predetermined reference value, the second iron loss reduction unit may adjust the current command of the motor for a current operation point of the motor to be moved from a point at which a maximum torque per ampere (MTPA) curve and an equal torque curve meet each other to a point at which a minimum flux per torque (MFPT) curve and the equal torque curve meet each other, on a motor static coordinate system.

In an embodiment of the present disclosure, the second iron loss reduction unit may predetermine a current command change start temperature and a higher current command change end temperature, start moving the current command of the motor from the point at which the MTPA curve and the equal torque curve meet each other on the motor static coordinate system in a direction of the point at which the MFPT curve and the equal torque curve meet each other along the equal torque curve when the temperature of the permanent magnet predicted by the permanent magnet temperature prediction unit reaches the current command change start temperature, and allow the current command of the motor to be determined at the point at which the MFPT curve and the equal torque curve meet each other when the temperature of the permanent magnet predicted by the permanent magnet temperature prediction unit reaches the predetermined current command end temperature.

According to another embodiment of the present disclosure, an iron loss reduction control method for motor permanent magnet overtemperature protection, includes: a permanent magnet temperature prediction step of predicting a temperature of a permanent magnet in a motor based on a driving state of the motor; a first iron loss reduction step of adjusting a switching frequency of a switching element in an inverter providing a driving power to the motor based on the temperature of the permanent magnet predicted in the permanent magnet temperature prediction step; and a second iron loss reduction step of adjusting a current command of the motor based on the temperature of the permanent magnet predicted in the permanent magnet temperature prediction step.

DRAWINGS

DETAILED DESCRIPTION

Hereinafter, iron loss reduction control apparatus and method for motor permanent magnet overtemperature protection according to exemplary embodiments of the present disclosure is described with reference to the accompanying drawings.

Figure 1:
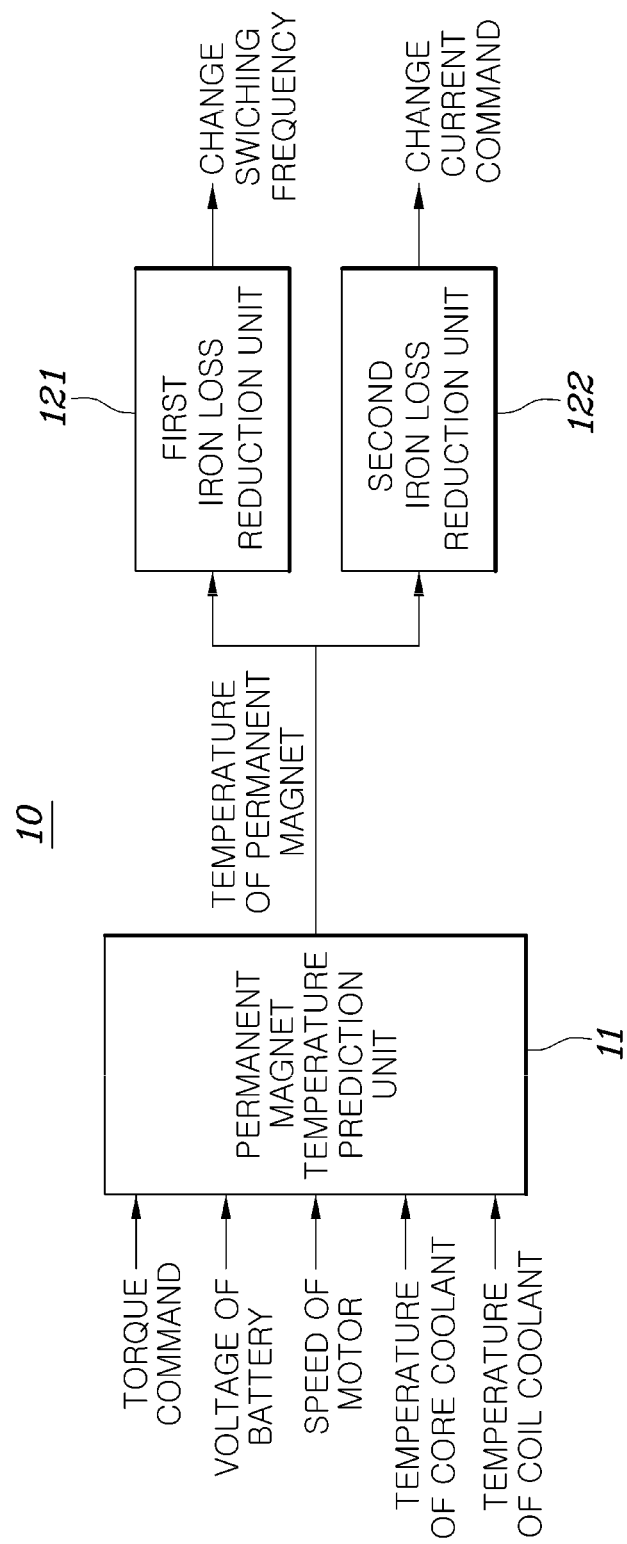
FIG. 1 is a block diagram showing an iron loss reduction control apparatus for motor permanent magnet overtemperature protection according to an embodiment of the present disclosure.

FIG. 1 is a block diagram showing an iron loss reduction control apparatus for permanent magnet overtemperature protection according to an embodiment of the present disclosure.

Referring to FIG. 1, an iron loss reduction control apparatus 10 for permanent magnet overtemperature protection according to an embodiment of the present disclosure includes: a permanent magnet temperature prediction unit 11 predicting a temperature of a permanent magnet positioned in a rotor of a motor; a first iron loss reduction unit 121 changing a switching frequency of a pulse width modulation (PWM) of an inverter providing a voltage to the motor based on the predicted temperature of the permanent magnet; and a second iron loss reduction unit 122 changing a value of a current command provided to the motor based on the temperature of the permanent magnet predicted by the permanent magnet temperature prediction unit 11.

The iron loss reduction control apparatus 10 for permanent magnet overtemperature protection according to an embodiment of the present disclosure shown in FIG. 1 may be implemented in the form of a controller including a processor and a memory; and the permanent magnet temperature prediction unit 11, the first iron loss reduction unit 121 and the second iron loss reduction unit 122 in the iron loss reduction control apparatus 10 for permanent magnet overtemperature protection may be implemented in such a manner that the processor reads and performs various logics or instructions which are pre-stored in the memory.

The permanent magnet temperature prediction unit 11 may perform a temperature prediction logic which models a characteristic of physical connections between internal motor components included in the motor.

Figure 2:
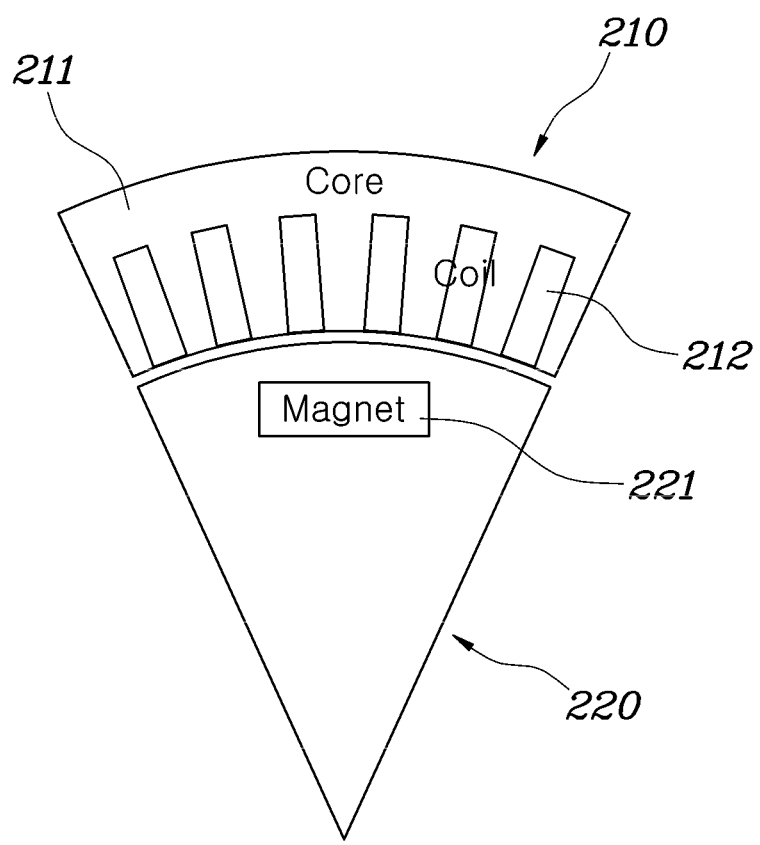
FIG. 2 is a diagram showing a partial cross section of a typical permanent magnet built-in synchronous motor.
Figure 3:
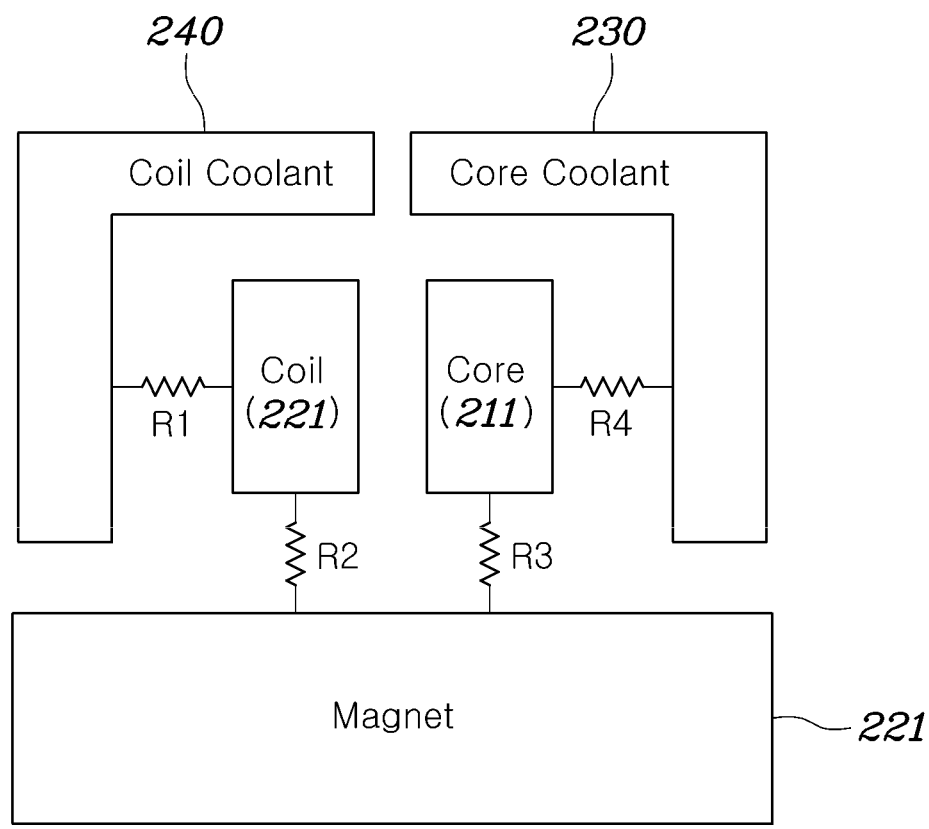
FIG. 3 is a diagram showing a model of a heat transfer path between respective components of the permanent magnet built-in synchronous motor as shown in FIG. 2.

FIG. 2 is a diagram showing a partial cross section of a typical permanent magnet built-in synchronous motor; and FIG. 3 is a diagram showing a model of a heat transfer path between respective components of the permanent magnet built-in synchronous motor as shown in FIG. 2.

Referring to FIGS. 2 and 3, the motor may include a stator 210 and a rotor 220, the stator 210 including a core 211 and a coil 212 wound thereon, and the rotor 220 including a permanent magnet 221 built therein.

In addition, although not shown in FIG. 2, a core coolant 230 and a coil coolant 240 may respectively be positioned in the core 211 and coil 212 of the stator 210 maintaining a fixed state without being rotated while generating heat among the components of the motor to cool the core 211 and coil 212.

FIG. 3 shows the model of a heat transfer path between the internal component of the motor and the coolant. In FIG. 3, reference numerals R1 to R4 each denote thermal resistance between the respective components of the motor. It may be possible to derive the temperature of the permanent magnet based on the thermal model as shown in FIG. 3.

Figure 4:
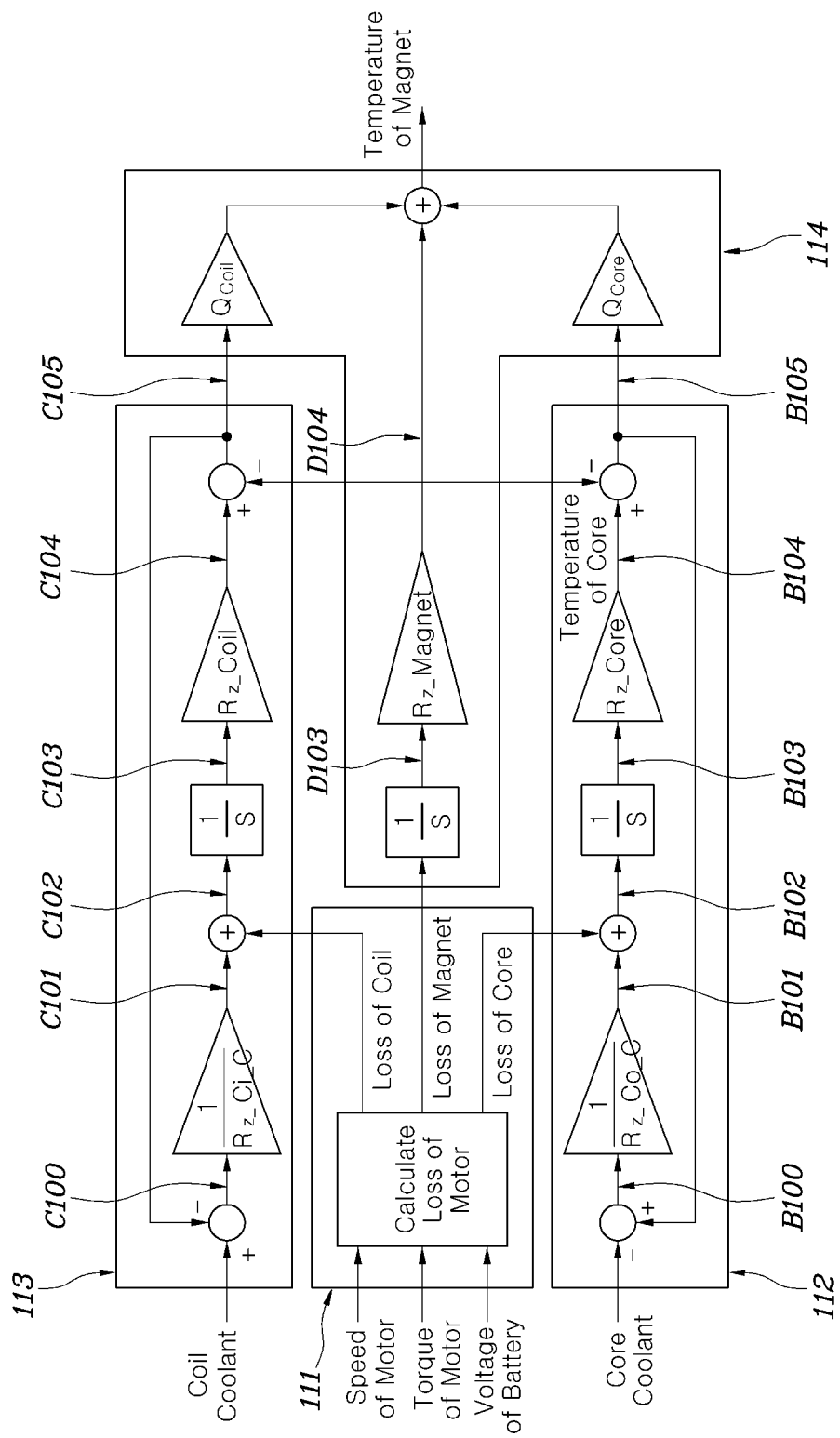
FIG. 4 is a diagram specifically showing a permanent magnet temperature estimation method performed by a permanent magnet temperature prediction unit used in the iron loss reduction control apparatus for permanent magnet overtemperature protection according to an embodiment of the present disclosure.

FIG. 4 is a diagram specifically showing a permanent magnet temperature estimation method performed by a permanent magnet temperature prediction unit used in the iron loss reduction control apparatus for permanent magnet overtemperature protection according to an embodiment of the present disclosure.

Referring to FIG. 4, the permanent magnet temperature prediction unit 11 includes: a motor loss calculation unit 111 calculating a loss of the motor, i.e. a loss of the coil, a loss of the core and a loss of the permanent magnet, based on a voltage of a battery storing a speed of the motor, a torque of the motor and a driving power of the motor; a core temperature estimation unit 112 estimating a temperature of the core based on the loss of the core calculated by the motor loss calculation unit 11 and a temperature of the core coolant; a coil temperature estimation unit 113 estimating a temperature of the coil based on the loss of the coil calculated by the motor loss calculation unit 11 and a temperature of the coil coolant; and a permanent magnet temperature estimation unit 114 estimating the temperature of the permanent magnet based on the temperatures of the core and the coil respectively estimated by the core temperature estimation unit 112 and the coil temperature estimation unit 113 and based on the loss of the permanent magnet calculated by the motor loss calculation unit 11.

The motor loss calculation unit 11 may derive each loss of the core 211, coil 212 and permanent magnet 221 based on a rotational speed of the motor, the torque of the motor and the voltage of the battery.

Each loss of the core 211, coil 212 and permanent magnet 221 based on the torque of the motor and the voltage of the battery may be predetermined in a test manner and stored in the form of a data map or an equation. The motor loss calculation unit 11 may receive corresponding values from sensors respectively detecting the speed of the motor, the torque of the motor and the voltage of the battery, and may derive the each loss by applying the values to the data map or equation storing the input values.

The core temperature estimation unit 112 may calculate a difference between the temperature of the core coolant 230 and the estimated temperature of the core 211 (B100), and divide this difference value by a thermal resistance ($R_s\_Core$) of the core 211 to derive a cooling amount of the core 211 achieved by the core coolant 230 (B101).

Next, the core temperature estimation unit 112 may derive an actual heating amount of the core 211, causing a change in the temperature of the core 211 by adding the loss of the core derived by the motor loss calculation unit 11 to the derived cooling amount of the core 211 (B102). The core temperature estimation unit 112 may calculate thermal energy changing the temperature of the core 211 by integrating the derived actual heating amount of the core 211 (B103), and multiply the calculated thermal energy by the thermal resistance ($R_s\_Core$) of the core 211 to derive the temperature of the core 211 (B104).

Next, the core temperature estimation unit 112 may subtract the temperature of the permanent magnet 221 derived by the permanent magnet temperature estimation unit 114 to be described below from the derived temperature of the core to obtain a difference between the temperatures of the core 211 and the permanent magnet 221 (B105).

The coil temperature estimation unit 113 may use a method similar to that of the core temperature estimation unit 112 to calculate a difference between the temperature of the coil coolant 240 and the estimated temperature of the coil 212 (C100), and derive a cooling amount of the coil 212 achieved by the coil coolant 240 by dividing this difference value by a thermal resistance ($R_s\_Coil$) of the coil 212 (C101).

Next, the coil temperature estimation unit 113 may derive an actual heating amount the coil 212, causing a change in the temperature of the coil 212 by adding the heating amount of the coil derived by the motor loss calculation unit 11 to the derived cooling amount of the coil 212 (C102). The coil temperature estimation unit 113 may calculate thermal energy changing the temperature of the coil 212 by integrating the derived actual heating amount of the coil 212 (C103), and derive the temperature of the coil 212 by multiplying the calculated thermal energy by the thermal resistance ($R_s\_Coil$) of the coil 212 (C104).

Next, the coil temperature estimation unit 113 may subtract the temperature of the permanent magnet 221 derived by the permanent magnet temperature estimation unit 114 to be described below from the derived temperature of the core to obtain a difference between the temperatures of the coil 212 and the permanent magnet 221 (C105).

The permanent magnet temperature estimation unit 114 may calculate thermal energy changing the temperature of the permanent magnet 221 by integrating the loss of the permanent magnet calculated by the motor loss calculation unit 11 (D103), and multiply the thermal energy value by a thermal resistance ($R_s$_Magnet) of the permanent magnet 221 to obtain the temperature of the permanent magnet (D104). Next, the permanent magnet temperature estimation unit 114 may add both a value obtained by multiplying the difference value between the temperatures of the core 211 and the permanent magnet 221, calculated by the core temperature estimation unit 112, by a heat transfer coefficient (Qcore) and a value obtained by multiplying the difference value between the temperatures of the coil 212 and the temperature of the permanent magnet 221, calculated by the coil temperature estimation unit 113, by a heat transfer coefficient (Qcoil) to the temperature value of the permanent magnet calculated based on the loss of the permanent magnet to obtain a final temperature of the permanent magnet in consideration of heat conducted in the core 211 and the coil 212.

The first iron loss reduction unit 121 may control the motor by reducing an iron loss of the motor based on the temperature of the permanent magnet estimated by the permanent magnet temperature prediction unit 11.

The inverter may be used to provide a driving voltage to the motor by using direct current (DC) power provided from a DC power source such as the battery. The inverter is a circuit converting a DC voltage into an alternating current (AC) voltage having a plurality of phases and providing the converted voltage to the motor, and may include a plurality of switching elements generating the AC voltage of each phase. It is possible to on/off control the plurality of switching elements using various pulse width modulation (PWM) methods. When the driving voltage is provided to the motor by PWM controlling the switching elements of the inverter, a voltage applied to the coil in the motor may be changed in proportion to a switching frequency of the switching element during the PWM control, and the magnetic flux density may thus be changed in a core plate and the permanent magnet.

Figure 5:
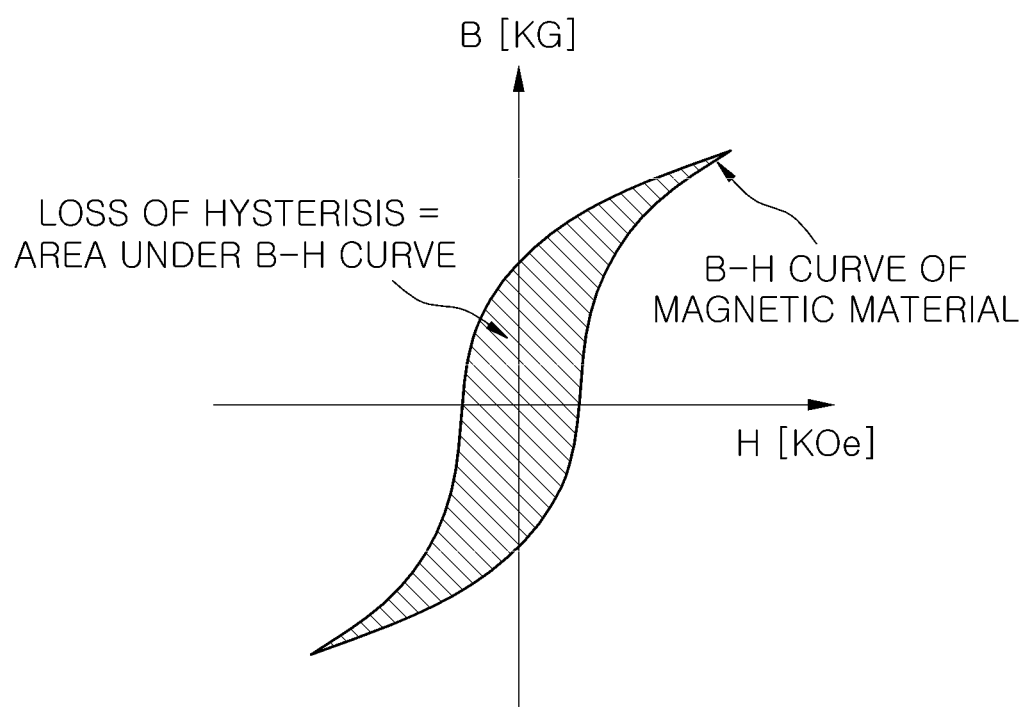
FIG. 5 is a diagram showing a B-H curve of a common magnetic material.

FIG. 5 is a diagram showing a B-H curve of a common magnetic material.

Both the magnet used for the motor and a metal plate used for the core may be magnetic materials, and the change in the magnetic flux density of the magnetic material due to the PWM may cause a loss of hysteresis, as shown in FIG. 5.

The first iron loss reduction unit 121 may reduce the switching frequency of the PWM control and thus reduce the number of switching to reduce the loss of the hysteresis occurring due to the magnetic flux density, and may further reduce the number of switching by changing the PWM method if an additional iron loss reduction is necessary even at the lowest switching frequency.

Figure 6:
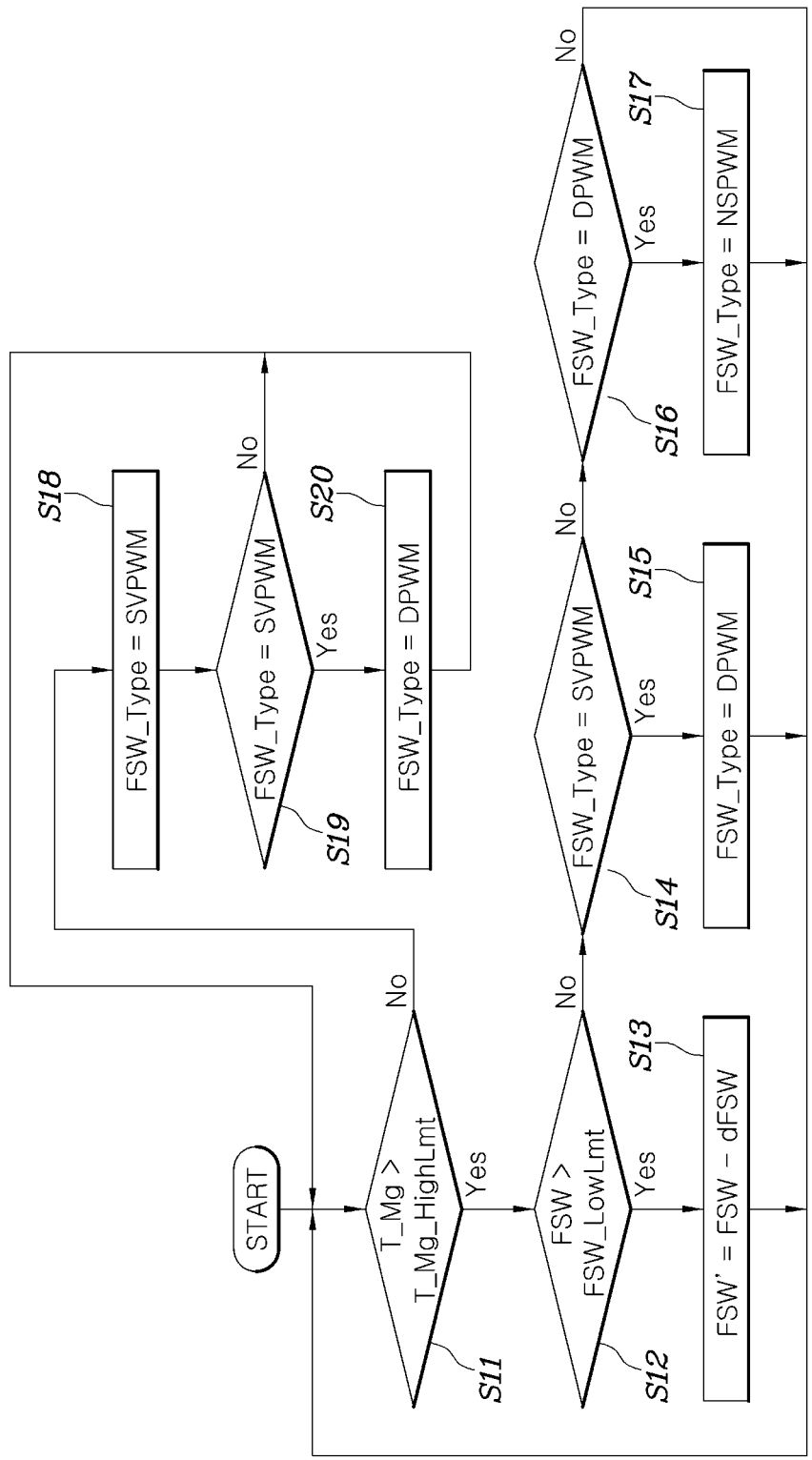
FIG. 6 is a flowchart showing an iron loss reduction control method of a first iron loss reduction unit in the iron loss reduction control apparatus for permanent magnet overtemperature protection according to an embodiment of the present disclosure.

FIG. 6 is a flowchart showing an iron loss reduction control method of a first iron loss reduction unit in the iron loss reduction control apparatus for permanent magnet overtemperature protection according to an embodiment of the present disclosure.

Referring to FIG. 6, in a case where the temperature (T_Mg) of the permanent magnet 221 estimated by the permanent magnet temperature prediction unit 11 is increased above a predetermined reference temperature (T_Mg_HighLmt) (S11), when the switching frequency (FSW) of the switching element in the inverter is higher than a predetermined minimum limit frequency (FSW_LowLmt) (S12), the switching frequency may be reduced by a predetermined reference unit (dFSW). The switching frequency may be reduced for each reference time until the temperature of the permanent magnet 221 is lowered to a predetermined reference temperature (T_Mg_HighLmt) or below (S12 and S13). In addition, the switching frequency may be reduced for each reference time until the switching frequency reaches the predetermined minimum limit frequency (FSW_LowLmt).

When the switching frequency is reduced, the change in the magnetic flux density of the magnetic material in the motor per unit time may be reduced, and the loss of hysteresis may thus be reduced in proportion thereto, thereby reducing the iron loss.

In a case where the temperature (T_Mg) of the permanent magnet 221 is not lowered to the predetermined reference temperature (T_Mg_HighLmt) or below, and the switching frequency reaches the predetermined minimum limit frequency (FSW_LowLmt), the first iron loss reduction unit 121 may stop reducing the switching frequency and change the PWM control method to reduce the change in the magnetic flux density even at the same switching frequency, thereby reducing the loss of hysteresis.

For example, in a case where a space vector PWM (SVPWM) method is pre-applied as a method to reduce the loss of hysteresis by changing the pulse width modulation (PWM) control method (S14), this SVPWM method may be changed to a near state PWM (NSPWM) method; and in a case where the NSPWM method is the pre-applied method (S16), this NSPWM method may be changed to a discontinuous PWM (DPWM) method. In this manner, it is possible to reduce the loss of hysteresis.

Figure 7:
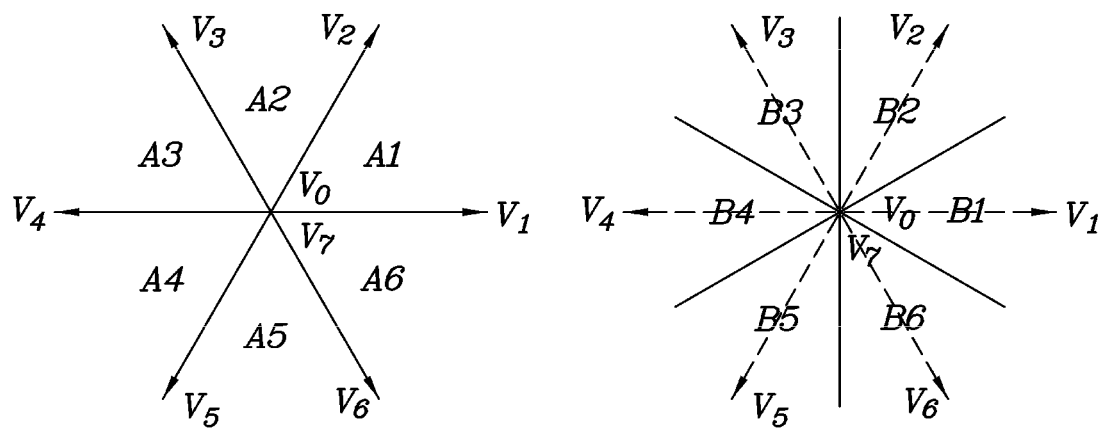
FIG. 7 is a diagram showing classified voltage space vectors on a general stator coordinate system.
Figure 8:
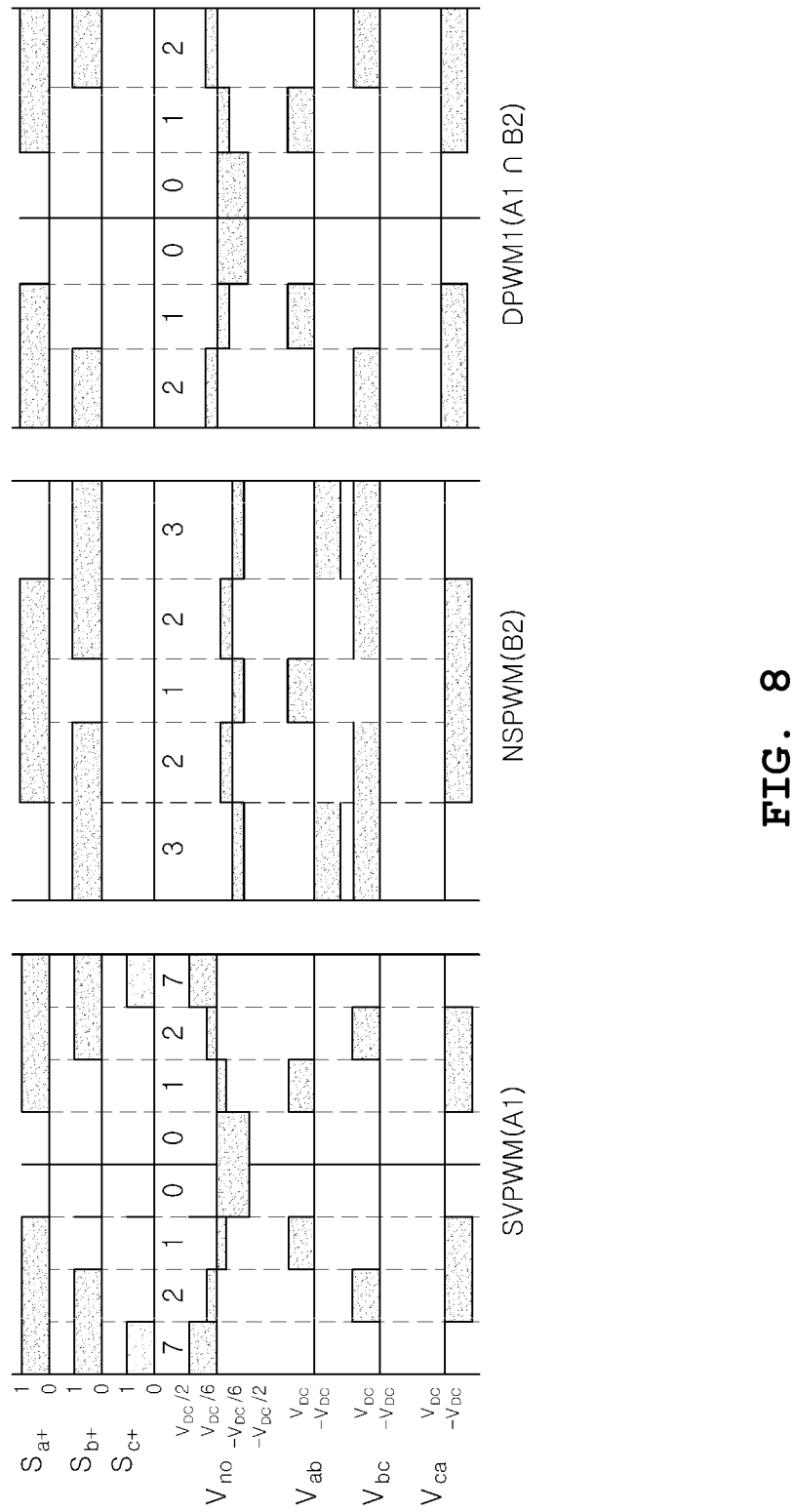
FIG. 8 is a diagram showing a state in which a characteristic space vector is switched for each pulse width modulation (PWM) control method.

FIG. 7 is a diagram showing classified voltage space vectors on a general stator coordinate system; and FIG. 8 is a diagram showing a state in which a characteristic space vector is switched for each PWM control method.

Referring to FIGS. 7 and 8, in the intersection space of an area A1 and an area B1 of FIG. 7, the SVPWM method may generate six switching changes per for each switching period, whereas the NSPWM method may generate four switching changes. The DPWM method may generate four switching changes like the NSPWM method; however, there may be an effective vector between active vectors, and the change in the magnetic flux density of the magnetic material may thus be smaller than that generated by the NSPWM method. Therefore, the DPWM may be advantageous in terms of the loss of hysteresis.

The first iron loss reduction unit 121 may reduce the number of the PWM switching to reduce the change in the magnetic flux density, and may thus reduce the loss of hysteresis, thereby reducing the iron loss; whereas, the second iron loss reduction unit 122 may reduce an amount of change in the magnetic flux density to reduce the losses.

Figure 9:
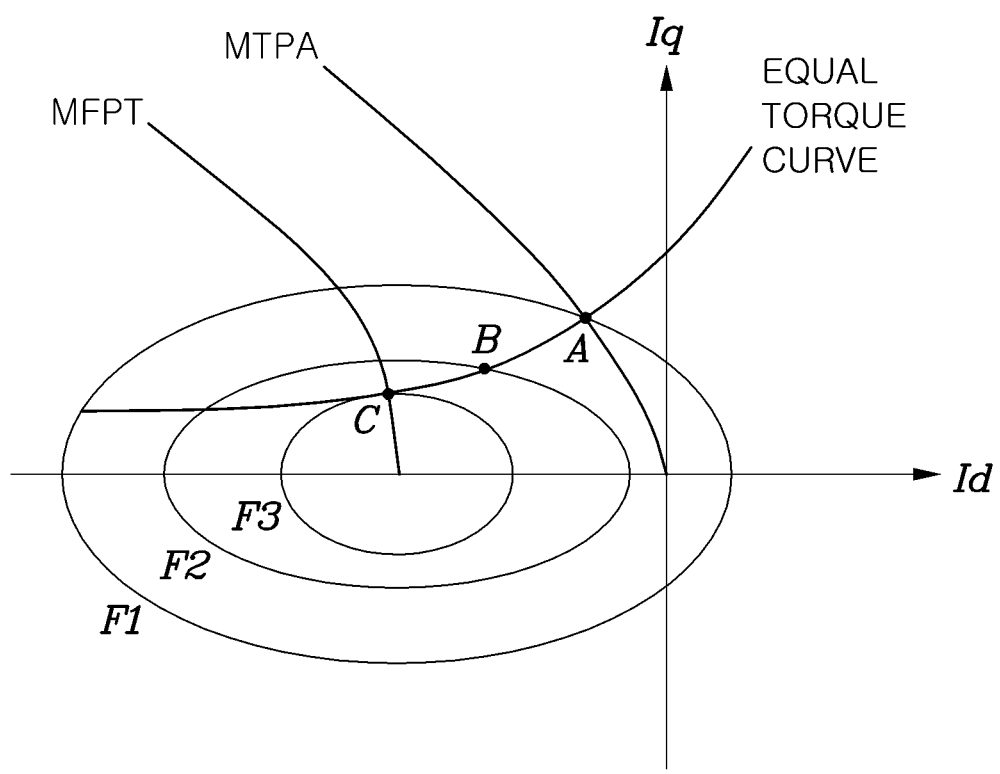
FIG. 9 is a graph showing the equal torque curve, maximum torque curve per ampere (MTPA) curve, and minimum flux per torque (MFPT) curve of a motor on a common coordinate system of the synchronous motor.
Figure 10:
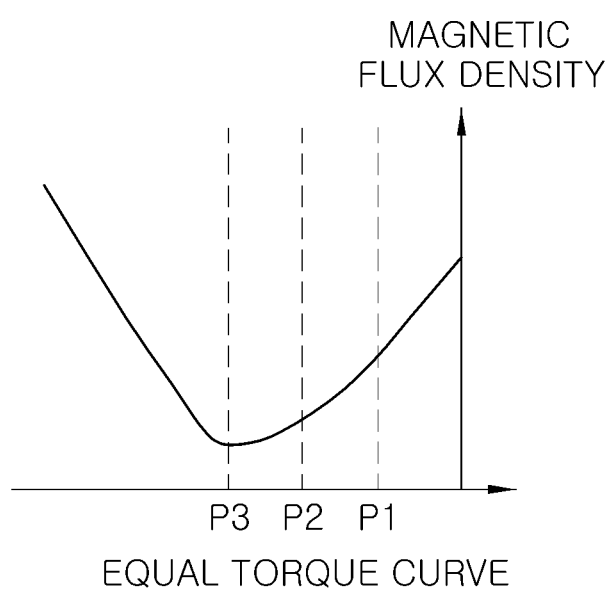
FIG. 10 is a graph showing a magnitude of each magnetic flux density at P1, P2 and P3 among operation points on the equal torque curve of FIG. 9.

FIG. 9 is a graph showing the equal torque curve, maximum torque per ampere (MTPA) curve, and minimum flux per torque (MFPT) curve of a motor on a common coordinate system of the synchronous motor; FIG. 10 is a graph showing a magnitude of each magnetic flux density at P1, P2 and P3 among operation points on the equal torque curve of FIG. 9; and FIG. 11 is a graph showing each B-H curve at operation points of P1, P2 and P3 shown in FIG. 9.

In FIG. 9, a curve indicated by the MTPA is the maximum torque per ampere curve, and a curve indicated by the MFPT is the minimum flux per torque curve. In addition, in FIG. 9, curves indicated by F1 to F3 are respective curves in which coordinates representing the same magnetic flux density are connected to each other, and the magnetic flux density of the curve indicated by F2 is smaller than that of the curve indicated by F1, and the magnetic flux density of the curve indicated by F3 is smaller than that of the curve indicated by F2.

In general, when the motor is driven at a low speed, the driven motor may have a sufficient voltage margin to control a current, and its current command may thus be selected at the intersection P1 of the equal torque curve and the maximum torque per ampere (MTPA) curve. When the motor has an increased speed and thus has an insufficient voltage margin, the current command may be moved from the maximum torque per ampere (MTPA) curve to the minimum flux per torque (MFPT) curve. The reason is that the closer the current command to the minimum flux per torque (MFPT) curve, the smaller the required magnetic flux density.

Figure 11:
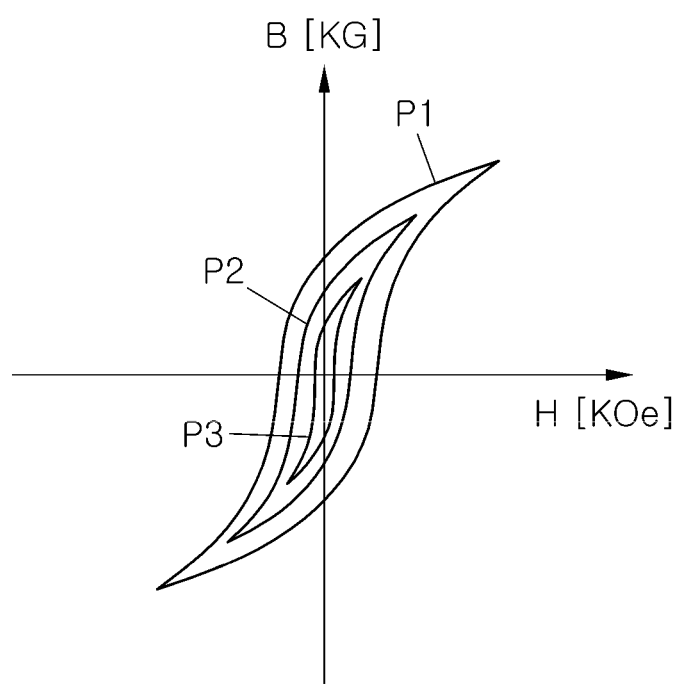
FIG. 11 is a graph showing each B-H curve at operation points of P1, P2 and P3 shown in FIG. 9.

As shown in FIGS. 10 and 11, the second iron loss reduction unit 122 may use this common method of controlling the motor to move a current operation point (i.e. the current command) from the point at which the maximum torque per ampere (MTPA) curve and the equal torque curve meet each other to the point at which the minimum flux per torque (MFPT) curve and the equal torque curve meet each other, thereby outputting the torque even when the voltage margin is sufficient. In this case, the second iron loss reduction unit 122 may reduce the change in the magnetic flux density of the magnetic material, thereby reducing the loss of hysteresis as shown in FIG. 5. That is, when the temperature of the permanent magnet 221 is higher than the predetermined reference temperature, the second iron loss reduction unit 122 may determine the current command of the motor so that the operation point of the motor is moved from P1 to P3 along the equal torque curve, and may thus reduce the change in the magnetic flux density, thereby reducing the loss of hysteresis.

Figure 12:
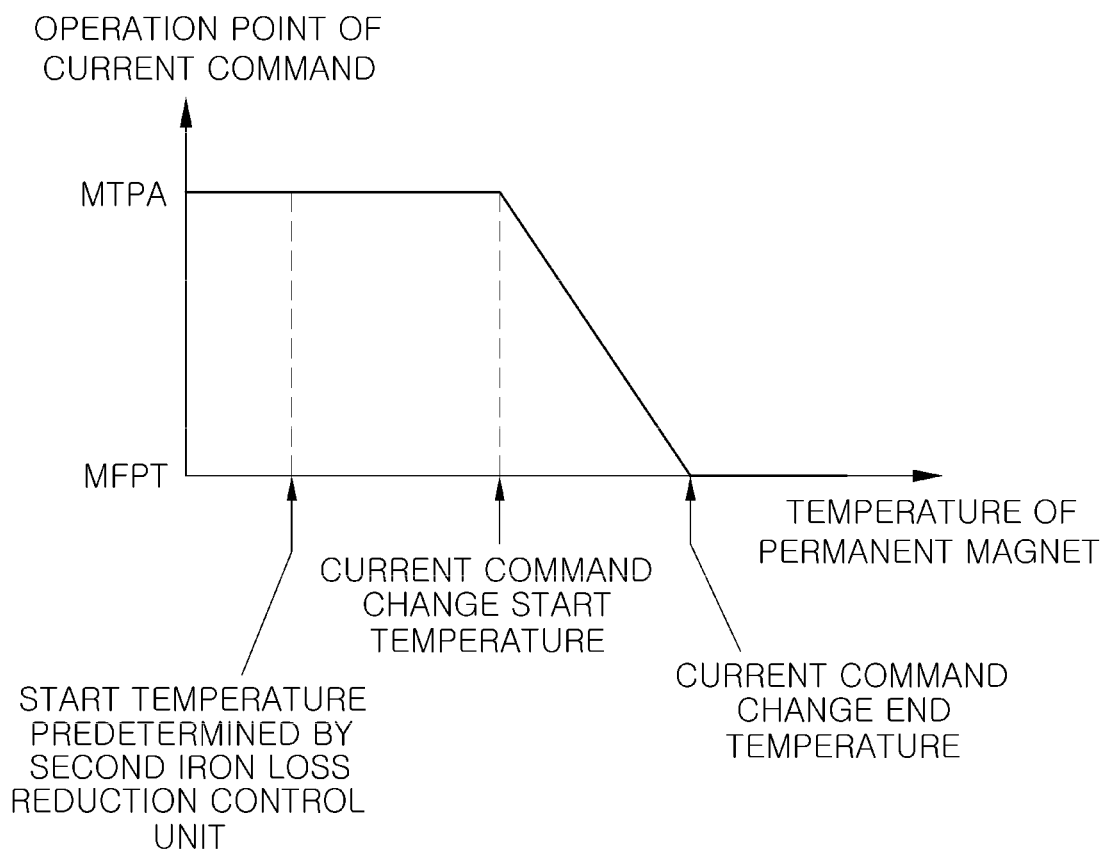
FIG. 12 is a graph showing an operation point change method performed by a second iron loss reduction unit of the iron loss reduction control apparatus for permanent magnet overtemperature protection according to an embodiment of the present disclosure.

FIG. 12 is a graph showing an operation point change method performed by the second iron loss reduction unit 122 of the iron loss reduction control apparatus for permanent magnet overtemperature protection according to an embodiment of the present disclosure.

The second iron loss reduction unit 122 may predetermine a current command change start temperature and a higher current command change end temperature.

When the temperature of the permanent magnet reaches the predetermined current command change start temperature, the second iron loss reduction unit 122 may start moving the current command of the motor from the point P1 at which the maximum torque per ampere (MTPA) curve and the equal torque curve meet each other to the point P3 at which the minimum flux per torque (MFPT) curve and the equal torque curve meet each other along the equal torque curve.

In addition, when the temperature of the permanent magnet reaches the predetermined current command change end temperature, the second iron loss reduction unit 122 may allow the current command of the motor to be determined at the point P3 at which the minimum flux per torque (MFPT) curve and the equal torque curve meet each other.

The present disclosure may provide an iron loss reduction control method using the iron loss reduction control apparatus for permanent magnet overtemperature protection as described above.

The iron loss reduction control method for permanent magnet overtemperature protection according to an embodiment of the present disclosure may include: a step of estimating a temperature of a permanent magnet in a motor by a permanent magnet temperature prediction unit 11 shown in FIG. 1, based on a torque command of the motor, a voltage of a battery providing a driving power to the motor, a speed of the motor, a temperature of a core coolant of the motor and a temperature of a coil coolant of the motor; a first reduction step of reducing a loss of the motor by controlling a switching frequency of a switching element in an inverter generating an alternating current (AC) driving voltage of the motor by a first iron loss reduction unit 121 based on the estimated temperature of the permanent magnet and a first reference temperature at which whether to perform a predetermined iron loss reduction is determined; and a second reduction step of reducing the loss of the motor by changing a current command of the motor by a second iron loss reduction unit 122 based on the estimated temperature of the permanent magnet and a second reference temperature at which whether to perform a predetermined iron loss reduction is determined.

The permanent magnet temperature prediction step may be a step in which the permanent magnet temperature prediction unit 11 performs a method of estimating the temperature of the permanent magnet as described in FIG. 4.

In addition, as shown in FIG. 6, the first reduction step may be a step in which the first iron loss reduction unit 121 reduces the switching frequency of the switching element in the inverter and changes a pulse width modulation (PWM) control method after the frequency is reduced to a predetermined minimum switching frequency, thereby performing the iron loss reduction control method.

In addition, as shown in FIG. 12, the second reduction step may be a step in which when the temperature of the permanent magnet 221 in the motor is between a predetermined current command change start temperature and a predetermined current command change end temperature, the second iron loss reduction unit 122 allows the current command of the motor to be moved from a point P1 at which a maximum torque per ampere (MTPA) curve and an equal torque curve meet each other to a value of a point P3 at which a minimum flux per torque (MFPT) curve and the equal torque curve meet each other along the equal torque curve.

A more detailed description of each step is already made through the detailed description of each component of the iron loss reduction control apparatus for permanent magnet overtemperature protection described above, and a redundant description thereof is thus omitted.

As set forth above, the iron loss reduction control apparatus and method for permanent magnet overtemperature protection according to various embodiments of the present disclosure may perform a function to protect the temperature of the permanent magnet from being increased to or above the temperature at which the permanent magnet is irreversibly demagnetized, by modeling the physical connection relationship between the components included in the motor and thus estimating the temperature of the permanent magnet in the motor.

The iron loss reduction control apparatus and method for permanent magnet overtemperature protection according to various embodiments of the present disclosure may use the maximum output of the motor within the available temperature range of the permanent magnet and thus may secure the maximum output of the motor.

The iron loss reduction control apparatus and method for permanent magnet overtemperature protection according to various embodiments of the present disclosure may estimate the temperature of the permanent magnet in the motor of the vehicle in real time and limit the cooling of the permanent magnet and the output of the motor to prevent the irreversible demagnetization of the permanent magnet, thereby achieving its optimum performance without using an expensive permanent magnet which is irreversibly demagnetized at a very high temperature. In addition, the iron loss reduction control apparatus and method for permanent magnet overtemperature protection according to various embodiments of the present disclosure may avoid introduction of an excessively large capacity cooling system used to prevent the increase in the temperature of the permanent magnet.

Effects obtainable in the present disclosure are not limited to the effects mentioned above. That is, other effects that are not mentioned may be obviously understood by those skilled in the art to which the present disclosure pertains from the following description.

Although the present disclosure has been shown and described with respect to specific embodiments, it is apparent to those having ordinary skill in the art that the present disclosure may be variously modified and altered without departing from the spirit and scope of the present disclosure as defined by the following claims.

What is claimed is:

1. An iron loss reduction control apparatus for motor permanent magnet overtemperature protection, comprising:
   a permanent magnet temperature prediction unit configured to predict a temperature of a permanent magnet in a motor based on a driving state of the motor;
   a first iron loss reduction unit configured to adjust a switching frequency of a switching element in an inverter providing a driving power to the motor based on the temperature of the permanent magnet; and
   a second iron loss reduction unit configured to adjust a current command of the motor based on the temperature of the permanent magnet;
   wherein the permanent magnet temperature prediction unit is configured to:
      calculate a loss of the motor based on the driving state of the motor; and
      predict the temperature of the permanent magnet based on the calculated loss of the motor, a temperature of a coolant cooling a core of the motor, and a temperature of a coolant cooling a coil of the motor.

2. The iron loss reduction control apparatus of claim 1, wherein the permanent magnet temperature prediction unit further includes:
   a motor loss calculation unit configured to calculate a loss of the core of the motor, a loss of the coil of the motor and a loss of the permanent magnet based on a rotational speed and torque of the motor and a voltage of a battery storing the driving power provided to the motor;
   a permanent magnet temperature estimation unit configured to calculate the temperature of the permanent magnet based on the loss of the permanent magnet;
   a core temperature estimation unit configured to:
      calculate a cooling amount of the core based on a difference between the temperature of the coolant cooling the core and a pre-estimated temperature of the core;
      calculate a temperature of the core based on the cooling amount of the core and the loss of the core; and
      calculate a difference between temperatures of the core and the permanent magnet by subtracting the temperature of the permanent magnet based on the loss of the permanent magnet from the temperature of the core; and
   a coil temperature estimation unit configured to:
      calculate a cooling amount of the coil based on a difference between the temperature of the coolant cooling the coil and a pre-estimated temperature of the coil;
      calculate a temperature of the coil based on the cooling amount of the coil and the loss of the coil; and
      calculate a difference between temperatures of the coil and the permanent magnet by subtracting the temperature of the permanent magnet based on the loss of the permanent magnet from the temperature of the coil, and
   wherein the permanent magnet temperature estimation unit is further configured to:
      calculate a final temperature of the permanent magnet by adding a first value obtained by multiplying the difference between the temperatures of the core and the permanent magnet by a first heat transfer coefficient between the core and the permanent magnet and a second value obtained by multiplying the difference between the temperatures of the coil and the permanent magnet by a second heat transfer coefficient between the coil and the permanent magnet to the temperature of the permanent magnet based on the loss of the permanent magnet.

3. The iron loss reduction control apparatus of claim 1, wherein, when the temperature of the permanent magnet is higher than a predetermined reference value, the first iron loss reduction unit is configured to reduce the switching frequency used to pulse width modulation (PWM) control the switching element of the inverter providing the driving power to the motor.

4. The iron loss reduction control apparatus of claim 3, wherein, when the temperature of the permanent magnet is higher than the predetermined reference value, the first iron loss reduction unit is configured to reduce the switching frequency to a predetermined reduction value for each predetermined period.

5. The iron loss reduction control apparatus of claim 3, wherein, when the temperature of the permanent magnet is higher than the predetermined reference value and the switching frequency is equal to or lower than the predetermined reference value, the first iron loss reduction unit is configured to change the pulse width modulation (PWM) control.

6. The iron loss reduction control apparatus of claim 5, wherein, when the PWM control is a space vector PWM (SVPWM), the first iron loss reduction unit is configured to change the SVPWM to a near state PWM (NSPWM).

7. The iron loss reduction control apparatus of claim 5, wherein, when the PWM control method is a near state PWM (NSPWM), the first iron loss reduction unit is configured to change the NSPWM to a discontinuous PWM (DPWM).

8. The iron loss reduction control apparatus of claim 1, wherein, when the temperature of the permanent magnet is higher than a predetermined reference value, the second iron loss reduction unit is configured to adjust the current command of the motor for a current operation point of the motor to be moved from a point at which a maximum torque per ampere (MTPA) curve and an equal torque curve meet each other to a point at which a minimum flux per torque (MFPT) curve and the equal torque curve meet each other, on a motor static coordinate system.

9. The iron loss reduction control apparatus of claim 8, wherein the second iron loss reduction unit is configured to:

predetermine a current command change start temperature and a higher current command change end temperature;

start moving the current command of the motor from the point at which the MTPA curve and the equal torque curve meet each other on the motor static coordinate system in a direction of the point at which the MFPT curve and the equal torque curve meet each other along the equal torque curve when the temperature of the permanent magnet reaches the current command change start temperature; and allow the current command of the motor to be determined at the point at which the MFPT curve and the equal torque curve meet each other when the temperature of the permanent magnet reaches the predetermined current command end temperature.

10. An iron loss reduction control method for motor permanent magnet overtemperature protection, comprising:

predicting, by a permanent magnet temperature prediction unit, a temperature of a permanent magnet in a motor based on a driving state of the motor;

adjusting, by a first iron loss reduction unit, a switching frequency of a switching element in an inverter providing a driving power to the motor based on the temperature of the permanent magnet; and adjusting, by a second iron loss reduction unit, a current command of the motor based on the temperature of the permanent magnet;

wherein predicting the temperature of the permanent magnet comprises:

calculating a loss of the motor based on the driving state of the motor; and predicting the temperature of the permanent magnet based on the calculated loss of the motor, a temperature of the permanent magnet based of the calculated loss of the motor, a temperature of a coolant cooling a core of the motor, and a temperature of a coolant cooling a coil of the motor.

11. The iron loss reduction control method of claim 10, wherein predicting the temperature of the permanent magnet comprises:

calculating a loss of the core of the motor, a loss of the coil of the motor and a loss of the permanent magnet based on a rotational speed and torque of the motor and a voltage of a battery storing the driving power provided to the motor;

calculating the temperature of the permanent magnet based on the loss of the permanent magnet;

calculating a cooling amount of the core based on a difference between the temperature of the coolant cooling the core and a pre-estimated temperature of the core;

calculating a temperature of the core based on the cooling amount of the core and the loss of the core;

calculating a difference between temperatures of the core and the permanent magnet by subtracting the temperature of the permanent magnet based on the loss of the permanent magnet from the temperature of the core;

calculating a cooling amount of the coil based on a difference between the temperature of the coolant cooling the coil and a pre-estimated temperature of the coil;

calculating a temperature of the coil based on the cooling amount of the coil and the loss of the coil;

calculating a difference between temperatures of the coil and the permanent magnet by subtracting the temperature of the permanent magnet based on the loss of the permanent magnet from the temperature of the coil; and calculating the permanent magnet by adding a first value obtained by multiplying the difference between the temperatures of the core and the permanent magnet by a first heat transfer coefficient between the core and the permanent magnet and a second value obtained by multiplying the difference between the temperatures of the coil and the permanent magnet by a second heat transfer coefficient between the coil and the permanent magnet to the temperature of the permanent magnet based on the loss of the permanent magnet.

12. The iron loss reduction control method of claim 10, wherein adjusting the switching frequency comprises:

when the temperature of the permanent magnet is higher than a predetermined reference value, reducing the switching frequency that is used to pulse width modulation (PWM) control the switching element of the inverter providing the driving power to the motor.

13. The iron loss reduction control method of claim 12, wherein adjusting the switching frequency comprises:

when the temperature of the permanent magnet is higher than the predetermined reference value, reducing the switching frequency to a predetermined reduction value for each predetermined period.

14. The iron loss reduction control method of claim 12, wherein adjusting the switching frequency comprises:

when the temperature of the permanent magnet is higher than the predetermined reference value and the switching frequency is equal to or lower than the predetermined reference value, changing the pulse width modulation (PWM) control.

15. The iron loss reduction control method of claim 14, wherein adjusting the switching frequency comprises:

when the PWM control is a space vector PWM (SVPWM), changing the SVPWM to a near state PWM (NSPWM).

16. The iron loss reduction control method of claim 14, wherein adjusting the switching frequency comprises:

when the PWM control is a near state PWM (NSPWM), changing the NSPWM to a discontinuous PWM (DPWM).

17. The iron loss reduction control method of claim 10, wherein adjusting the current command comprises:

when the temperature of the permanent magnet is higher than a predetermined reference value, adjusting the current command of the motor for a current operation point of the motor to be moved from a point at which a maximum torque per ampere (MTPA) curve and an equal torque curve meet each other to a point at which a minimum flux per torque (MFPT) curve and the equal torque curve meet each other, on a motor static coordinate system.

18. The iron loss reduction control method of claim 17, wherein adjusting the current command comprises:

predetermining a current command change start temperature and a higher current command change end temperature;

when the temperature of the permanent magnet reaches the current command change start temperature, moving the current command of the motor from the point at which the MTPA curve and the equal torque curve meet each other on the motor static coordinate system in a direction of the point at which the MFPT curve and the equal torque curve meet each other along the equal torque curve; and when the temperature of the permanent magnet reaches the predetermined current command end temperature, allowing the current command of the motor to be determined at the point at which the MFPT curve and the equal torque curve meet each other.

* * * * *